United States Patent [19]

Westra et al.

[11] Patent Number: 4,945,947
[45] Date of Patent: Aug. 7, 1990

[54] BALL-TYPE CHECK VALVE

[75] Inventors: Lubbert Westra; Brent Lirette, both of Houma, La.

[73] Assignee: Chromalloy American Corporation, St. Louis, Mo.

[21] Appl. No.: 357,121

[22] Filed: May 26, 1989

[51] Int. Cl.[5] .............................................. F16K 15/00
[52] U.S. Cl. .............................. 137/519.5; 137/533.11
[58] Field of Search ................. 137/519.5, 519, 533.11

[56] References Cited

U.S. PATENT DOCUMENTS

| | | | |
|---|---|---|---|
| 1,490,848 | 4/1924 | Pettit | 137/519.5 |
| 1,577,740 | 3/1926 | Macomber et al. | 137/519.5 |
| 1,700,603 | 1/1929 | Vreeland et al. | 137/519.5 |
| 1,882,314 | 10/1932 | Burt | 137/519.5 |
| 1,906,312 | 5/1933 | Burt | 137/533.11 |
| 2,309,839 | 2/1943 | Gardner | 137/519.5 |
| 3,759,281 | 9/1973 | Falcuta | 137/519.5 |
| 3,770,001 | 11/1973 | Davis | 137/533.11 |
| 3,776,258 | 12/1973 | Dockins, Jr. | 137/519.5 |
| 4,655,247 | 4/1987 | Westra et al. | 137/519.5 |
| 4,687,019 | 8/1987 | Mayfield | 137/519.5 |

*Primary Examiner*—John Rivell
*Assistant Examiner*—L. R. Leo
*Attorney, Agent, or Firm*—Mitchell D. Bittman; Herbert B. Roberts

[57] ABSTRACT

This invention involves an improved ball-type check valve for use in conditions such as oil and gas drilling which involve abrasive fluids, high pressures, and high temperatures. In this improved check valve, a one-piece ball retainer is provided which consists of (1) a retainer ring for the ball, (2) a base, and (3) at least two vertical supports which connect the retainer ring and the base. Peripheral channels are formed by (a) orifices which pass between the vertical supports, adjoined to (b) recessed areas in the base. This allows the interior passageway (through the retainer ring) to be relatively large in relation to the peripheral channels. This has two effects. When downward flow begins, fluid velocity through the interior passageway is relatively high, which helps ensure rapid settling of the ball on the retainer ring. As downward flow continues through the peripheral channels, the small size of the peripheral channels causes continued high velocity, resulting in a relatively low pressure area below the ball compared to the pressure above the ball. This ensures that the ball remains securely settled on the retainer ring. The entire valve can be assembled in a free-standing housing, or in a standard collar or shoe used in drilling or workover operations. This improved valve is easier and less expensive to manufacture than valves having flexible skirts, and it can be used with any size casing or tubing.

4 Claims, 4 Drawing Sheets

BALL-TYPE CHECK VALVE

FIELD OF THE INVENTION

This invention relates to a ball-type check valve, and more especially to ball-type check valves for use in conditions involving high pressure and abrasive fluids, such as in drilling oil and gas wells.

BACKGROUND OF THE INVENTION

Check valves are used in piping systems to allow the flow of a fluid (a liquid, slurry, or gas) in one direction but not in the other direction. A ball-type check valve utilizes a ball which is not directly attached to any other component of the valve, but which is constrained within a cage or other supporting assembly. When the fluid flows in the allowed direction, the ball is supported on a device (such as a retainer cup with orifices around the periphery) which allows fluid to flow around the perimeter of the ball. When the fluid flows in the opposite direction, the ball is pressed against a constricted passageway called a "seat", which blocks the flow in that direction.

Various ball-type check valves have been developed for conventional fluid-handling systems. See, e.g., U.S. Pat. Nos. 4,091,849 (Stevenson 1978), 2,328,014 (Heigis 1941), 4,236,759 (Lysenko 1980) and 2,279,513 (Hage 1939).

More sophisticated ball-type check valves have been developed for use in oil and gas drilling and workovers, which involve high pressures, high temperatures, and abrasive fluids such as drilling muds and cements. Those check valves have several distinct uses. For example, the ball-type check valves disclosed in U.S. Pat. No. 3,474,861 (Watkins 1968) and in U.K. patent application GB-2-102-474-A (Cunningham et al) are designed as blowout preventers. Some degree of flow in the upward direction is allowed, but if the upward flow exceeds a certain rate, it will carry the ball up to the seat and stop the flow. By contrast, valves used in "float" equipment during oil and gas drilling are designed to stop any upward flow. They are used during operations such as cementing a string of casing inside a wellbore during a drilling operation, or closing off a depleted formation during a workover. Such valves are described in U.S. Pat. Nos. 1,882,314 (Burt 1932), 3,776,258 (Dockins 1973), and 4,655,247 (Westra et al, 1987).

As used herein, "oil and gas drilling operations" includes any operations (such as cementing, workovers, etc.) that are done to create wells (including production or injection wells) that are involved in producing oil and/or gas.

U.S. Pat. No. 4,655,247 relates to a ball-type check valve sold by Gemoco of Houma, La. (a division of Chromalloy Company, which is a subsidiary of Sequa Corporation), which is widely used within the oil and gas industry. The design of these valves can be appreciated by considering the operating conditions they must endure. For example, a proposed American Petroleum Institute recommended procedure for testing float equipment requires that valves designed for use in cementing operations be tested by pumping drilling mud carrying 2 to 4% sand through the valve at rates of 10 barrels per minute (for any valve in casing sizes of 4.5 inches or larger) or 6 bbl/min (for smaller casing and tubing sizes). After being abraded in that manner for 24 hours, the valves must withstand 5000 pounds per square inch (psi) of back pressure.

The ball-type check valve described in U.S. Pat. No. 4,655,247 contains a flexible skirt near the outlet, which serves several purposes. As downward flow through the valve begins, the skirt serves as a restriction which reduces the area of the peripheral channels. This causes most of the fluid to flow initially through the interior passageway (i.e., through the retainer cup), which promotes rapid settling of the ball on the retainer cup and reduces hammering. After the ball settles on the retainer cup, the fluid must flow through the peripheral channels, which causes the flexible skirt to flex inward. This allows high volumes of drilling mud or cement and large particles to pass through the peripheral channels. In addition, the flexible skirt helps to create a zone of low pressure below the ball, which helps keep the ball securely settled on the cup during downward flow. When the pressure is reversed and upward flow begins, the skirt flexes outward and directs most of the fluid into the interior passage, which ensures that the ball will be lifted off the retainer cup and seated promptly to block the inlet with minimal hammering.

Despite those advantages, the flexible skirt configuration has several limitations. Most importantly, it is difficult to use a flexible skirt in a valve in small casing or tubing (4" diameter or less). The flexible skirt also increases the manufacturing cost; since it cannot be manufactured out of the same metal or hard plastic used to make the rest of the valve, each piece must be fabricated separately, then the components must be assembled.

One object of the present invention is to create a ball-type check valve which can operate under conditions of high pressure, high temperature, and abrasion, but which eliminates the need for the flexible skirt disclosed in U.S. Pat. No. 4,655,247. A second object of the present invention is to create a ball-type check valve for oil and gas drilling, which is small enough to be fitted into casing or tubing with a diameter of 4" or less.

Another object of this invention is to create a ball-type check valve capable of withstanding harsh conditions, which can be constructed from a minimal number of components. A fourth object is to create a check valve for use in oil and gas drilling, which can be assembled from a minimum number of components using a standard collar or shoe as the cage that holds the valve assembly.

SUMMARY OF THE INVENTION

This invention involves an improved ball-type check valve for use in conditions such as oil and gas drilling which involve abrasive fluids, high pressures, and high temperatures. In this improved check valve, a one-piece ball retainer is provided which consists of (1) a retainer ring for the ball, (2) a base, and (3) at least two vertical supports which connect the retainer ring and the base. Peripheral channels are formed by (a) orifices which pass between the vertical supports, adjoined to (b) recessed areas in the base. This allows the interior passageway (through the retainer ring) to be relatively large in relation to the peripheral channels. This has two effects. When downward flow begins, fluid velocity through the interior passageway is relatively high, which helps ensure rapid settling of the ball on the retainer ring. As downward flow continues through the peripheral channels, the small size of the peripheral channels causes continued high velocity, resulting in a relatively low pressure area below the ball compared to the pressure above the ball. This ensures that the ball remains securely settled on the retainer ring. The entire valve can be assembled in a free-standing housing, or in a standard collar or shoe used in drilling or workover operations. This improved valve is easier and less expensive to manufacture than valves having flexible skirts, and it can be used with any size casing or tubing.

DESCRIPTION OF A PREFERRED EMBODIMENT

Figure 1:
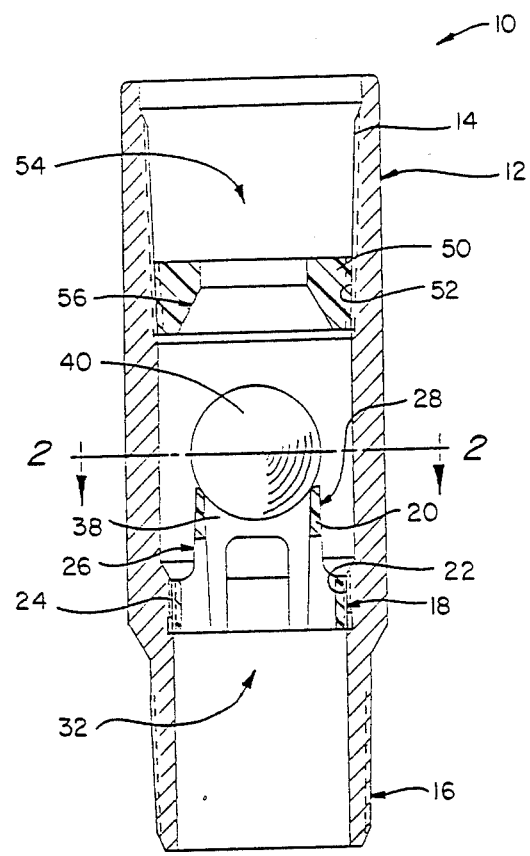
FIG. 1 is a longitudinal cross-section view of a check valve in accord with the present invention, as a cross-section taken along line 1—1 of FIG. 2, wherein a standard float collar serves as the housing for the valve.

Referring to the drawings more particularly by reference numbers, the ball-type check valve 10 shown in FIG. 1 is a preferred embodiment, constructed according to the teachings of the present invention, of a prototype valve constructed for testing purposes, which will fit in a 2 ⅜" tubing (i.e, a tubing having a 2.875" outside diameter). Except as otherwise discussed below, the dimensions of the prototype can be scaled up directly to accomodate any desired tubing or casing size. Alternately, minor modifications can be made to those dimensions if desired, without departing from the teachings and claims of this invention.

As shown in FIG. 1, check valve 10 is contained in collar 12, which can be any standard float collar (or float shoe) designed for use in oil and gas drilling. Other preferred embodiments of the valve assembly, which are described below and shown in FIGS. 6, 7 and 8, can be enclosed within free-standing housings which can be securely affixed inside standard collars or shoes.

Collar 12 shown as an example in FIG. 1 is a standard float collar with an M&F configuration, with female threads 14 at the top and male threads 16 at the bottom. Collar 12 also has internal threads 18 located slightly above the upper reach of male threads 16.

The valve is assembled by inserting ball retainer 20 (hereafter referred to simply as retainer 20) into collar 12 and engaging threads 22, which are located on the outside of base 24, with internal collar threads 18. Other means of affixing the retainer inside the collar (such as cementing, welding, fitting the retainer base against specialized shoulders in the collar, casting the collar and retainer as a single piece of metal, etc.) may be used if desired, if they provide sufficient strength for the intended use.

Retainer base 24, which preferably extends around the entire periphery of the retainer, is attached to two or more vertical supports 26, which join and support retainer ring 28 at the top of retainer 20.

Figure 2:
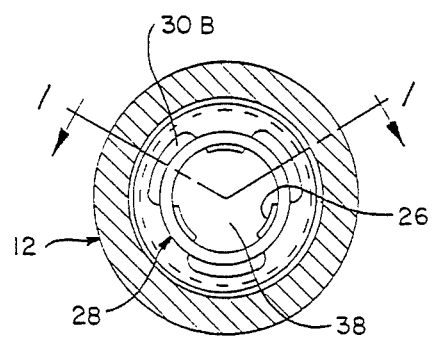
FIG. 2 is a sectional view of a check valve of this invention, taken along line 2—2 of FIG. 1, with the ball not shown.

Vertical supports 26 are separated from each other by peripheral flow channels 30. As shown more clearly in FIGS. 2 through 4, each flow channel 30 can be envisioned as being created by two openings which are connected but which involve different surfaces of retainer 20. Sub-channel 30A is cut out of the vertical support structure, and separates two vertical supports 26. In addition, sub-channel 30B comprises a recessed area in the thickened wall of base 24. Adjacent sub-channels 30A and 30B join together to form a single peripheral channel 30. All of the peripheral channels 30 join together in outlet 32.

Figure 5:
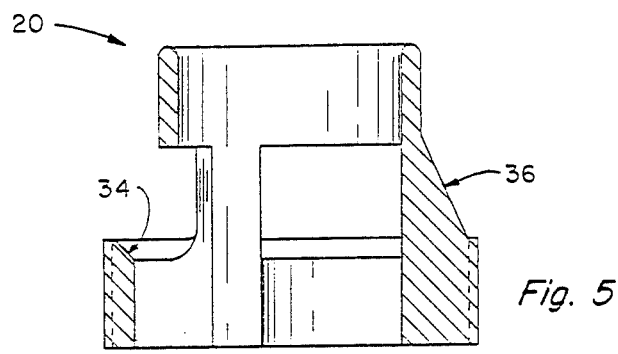
FIG. 5 is a longitudinal cross-sectional view of the retainer of this invention, showing several optional tapered surfaces which can be used to minimize turbulence and abrasion.

Peripheral channels 30 can be created during the molding or casting process, or they can be milled from a semi-finished piece. If desired, vertical supports 26 can comprise thickened supports with circular or elliptical cross-sections, rounded edges, etc. Vertical supports 26 can also comprise various types of rounded, tapered or sloping surfaces to minimize turbulence, such as peripheral channel shoulder 34 and vertical support abutment 36 (which can be conically shaped) shown in FIG. 5.

Interior passageway 38 passes through retainer ring 36 and joins the three peripheral channels 30 to form outlet 32.

Figure 3:
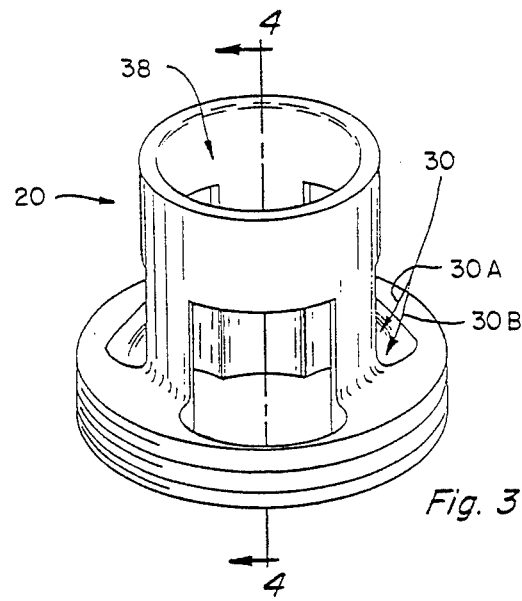
FIG. 3 is a perspective view of the ball retainer of this invention.
Figure 4:
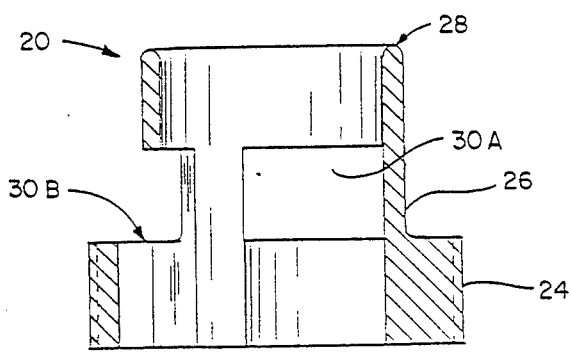
FIG. 4 is a longitudinal cross-sectional view of the ball retainer of this invention, taken along line 4—4 of FIG. 3.

Retainer 20, which is made of base 24, vertical supports 26, and retainer ring 28, is shown in a perspective view in FIG. 3, and in a cross-sectional view in FIG. 4. It is preferably manufactured from a single piece of material. For example, it may be machine-finished from a piece cast from a metal such as aluminum. Alternately, it may be molded from high-strength plastic. In either case, it should be made of material which can be drilled out after a cementing or other downhole operation is completed.

When the valve is not filled with pressurized fluid, ball 40 can move freely within valve assembly 10, between retainer ring 28 and seat 50. It normally rests on retainer ring 28. The angle where ball 40 meets ring 28 must prevent the ball from being wedged into the ring. Suitable angles range from about 45 to about 60 degrees from the main axis of the valve. The top edge of ring 28 preferably should be contoured to create a substantial area of sealing contact with the ball.

The ball can be made from any material or combination of materials with the following characteristics: (1) the surface of the ball must have some degree of resiliency, allowing it to form a liquid-tight seal even after abrasion, but it must not have too much elasticity, which would allow it to become wedged into the retainer ring; (2) it must have sufficiently low density so that it will rise readily in an upward-flowing stream of water or any other fluid having a density higher than water. Various materials have been developed for such use, including aluminum and other frangible metals, rigid plastics, and fiber-reinforced phenolic compounds. If desired, ball 40 can be made of a core material which can be coated with a rubberized surface if desired. Seat shoulder 56 and/or retainer ring 28 can also be coated with a rubberized surface.

After retainer 20 and ball 40 have been properly emplaced inside collar 12, seat 50 is placed in collar 12 and secured by engaging seat threads 52 with collar threads 14. Alternately, seat 50 can be affixed in a collar or shoe by other means such as cementing, welding, etc. Seat 50 contains inlet passageway 54, which is centered and circular. Tapered shoulder 56 provides a surface that forms a liquid-tight seal when ball 40 is pressed against seat 50.

In the prototype valves constructed and tested to date, the horizontal cross-sectional area of interior passageway 38 has exceeded 65% of the total area of peripheral channels 30.

In calculating the area of each peripheral channel 30, two quantities must be determined and then added. The first quantity is the cross-sectional area of sub-channel 30A, which passes horizontally between two of the vertical supports 26. As calculated herein, that cross-sectional area is measured on a planar basis, wherein the plane of measurement crosses sub-channel 30 at its narrowest point, to provide an accurate reading of the area through which fluid can pass.

The second quantity which makes up the area of each peripheral channel is the cross-sectional area of sub-channel 30B, a recessed area which passes vertically through retainer base 24. That area is measured horizontally, perpendicular to the central axis of the ball valve.

As mentioned above, each sub-channel 30A joins with a sub-channel 30B to form a single peripheral channel 30. The area of the peripheral channel is determined by adding the areas of the two sub-channels. The total area of all the peripheral channels is determined by adding the area of each peripheral channel.

The ratio of the area of interior passage 38 to the area of peripheral channels 30 is preferably in the range of about 60% to about 80%. Tests done to date indicate that a ratio of about 70% enhances rapid seating of the ball on retainer ring 28 (during downward flow) or shoulder 56 (blocking upward flow), in valves designed for use with 2.875" tubing, without requiring a flexible skirt near the outlet of the valve. Optimal channel area ratios for valves designed for use in different tubing or casing sizes may vary, and may be determined through routine experimentation using any desired tubing or casing size. Such testing may be done by subjecting valves with a range of channel sizes and ratios to abrasion and pressure tests while monitoring them for hammering.

Figure 6:
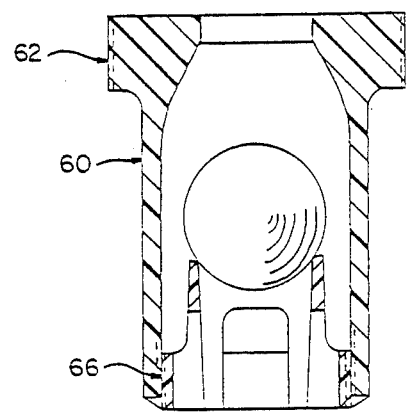
FIG. 6 is a longitudinal cross-section view of an improved ball-type check valve in accord with the present invention, wherein the valve is contained within a free-standing housing with external threads.
Figure 7:
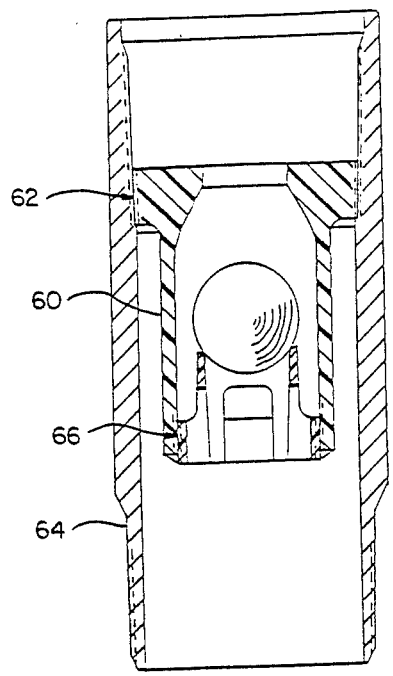
FIG. 7 is a longitudinal cross-section view of a ball type check valve contained within a free-standing housing as shown in FIG. 6, wherein the entire assembly is affixed inside a threaded collar.

In an alternate preferred embodiment, shown in FIG. 6 and FIG. 7, the valve assembly is contained within housing 60, which allows the valve to be pre-assembled and shipped as a free-standing unit before it is inserted into a collar or shoe. Housing 60 can comprise external threads 62, which will allow it to be affixed within a standard collar 64 as shown in FIG. 7.

If desired, housing 60 can comprise an extension of seat 50, having internal threads 66 at the lower end which can be securely attached to base 24 of ball retainer 20, as shown in FIG. 6. Alternately, housing 60 can comprise an extension of retainer 20, with threads at the upper end so it can be affixed to seat 50. Alternately, it can comprise a tubular component with threads at both ends which can be affixed to seat 50 and to retainer 20.

Figure 8:
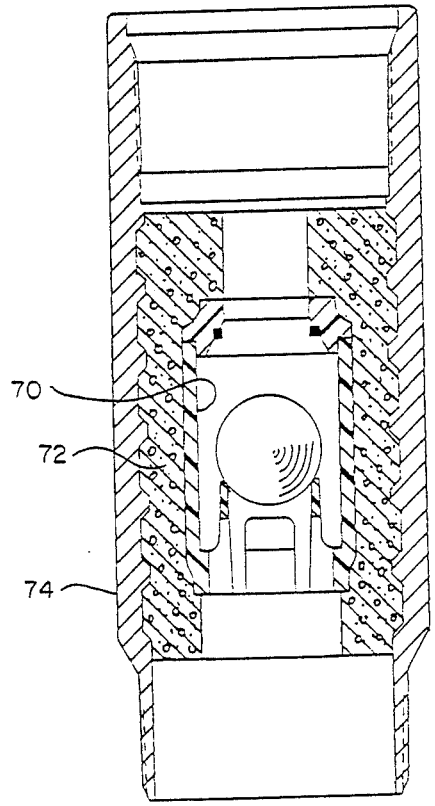
FIG. 8 is a longitudinal cross-section view of an improved ball-type check valve in accord with the present invention, wherein the valve is contained within a free-standing housing which is cemented inside a large collar for use in a wellbore having a large diameter.

Another preferred embodiment, shown in FIG. 8, depicts a check valve designed for use in a large casing. As shown therein, the valve is enclosed within housing 70, which is affixed by cement in a standard collar 74. This configuration is used because ball-type check valves having a ball diameter less than about 4" enjoy several advantages compared to larger valves, including (1) less force is exerted by the ball on the retainer during downward flow; (2) smaller valves provide a useful throttling effect and prevent "free fall" of cement if there is a large disparity between the densities of the cement and the drilling mud; and (3) it is easier and less expensive to mold balls having sufficiently precise roundness if the diameter is less than about 4" especially when materials such as thermosetting phenolic resins are used.

Preferred materials of construction for the valve housing (if any), the valve seat, and the ball retainer include well known abrasion-resistant and high-temperature-resistant plastics, particularly those comprised of thermosetting phenolic resins. Other plastic materials which may be suitable for certain uses include reinforced nylons, polycarbonates, rigid acrylonitrile-butadiene-styrene copolymers and other rigid plastics. Other materials, including ceramic materials, may also be used in some applications. Metals used in conventional valve construction, such as aluminum, brass, and copper, and other metals used in valve construction may be used in this invention. Steel valves may also be used in some situations, if it is not necessary to drill through the valve after a cementing or other operation is finished.

A ball-type check valve assembly particularly adapted to be used on float equipment used to cement tubing or casing in well bores can be constructed utilizing the aformentioned preferred materials. The check valve assembly constructed in this manner effectively prevents backflow of cement slurry and other fluids, and it can be drilled out with a conventional drill bit after the cementing operation is complete.

Those skilled in the art will recognize, or may ascertain using no more than routine experimentation, numerous equivalents to the specific embodiments disclosed herein. Such equivalents are within the scope of the subject invention.

We claim:

1. In a ball-type check valve, a ball retainer consisting essentially of:

(a) a base at one end, designed to securely mount said ball retainer inside a cylindrical conduit, wherein a channel is adapted to allow fluid to pass through the base, wherein said channel includes a central channel region and at least two peripheral channel regions formed by recessed areas in said base;

(b) a retainer ring which forms a continuous circle at a second opposed end, wherein said retainer ring forms and encloses a central orifice through which fluid can pass if a ball is not seated on the retainer ring; and (c) at least two vertical supports connecting said base to said retainer ring, wherein said vertical supports are predominantly within a cylindrical region that includes said retainer ring, and wherein orifices pass between said vertical supports, adapted to allow fluid to flow through the ball retainer when a ball is seated on the retainer ring, wherein each orifice is adjoined with one of said aforesaid peripheral channel regions passing through said base to form a contiguous flow channel.

2. The ball retainer of claim 1, wherein the area of an interior passage which passes through said retainer ring is about 60% to about 80% of the sum of the areas of said peripheral channels.

3. The ball retainer of claim 1, wherein said ball retainer includes a retainer base fitted with external threads which allows said retainer base to be securely affixed within a float collar or a float shoe designed for oil and gas drilling operations.

4. The ball retainer of claim 1, wherein said ball retainer, a ball, and a seat are enclosed within a free-standing housing which is designed to be securely affixed within a float collar or a float shoe designed for oil and gas drilling operations.

* * * * *